United States Patent [19]

Hill et al.

[11] Patent Number: 5,128,898

[45] Date of Patent: Jul. 7, 1992

[54] METHOD AND APPARATUS FOR DETECTING ORIENTATION OF DOWNHOLE GEOPHONES

[75] Inventors: Britt Hill, Spring; Hanna Khalil, Cypress; Robert Albers, Houston, all of Tex.

[73] Assignee: Halliburton Geophysical Services, Inc., Duncan, Okla.

[21] Appl. No.: 591,582

[22] Filed: Oct. 2, 1990

[51] Int. Cl.$^5$ .................. G01V 1/40; E21B 47/022
[52] U.S. Cl. .................. 367/13; 367/25; 367/911; 181/104; 33/309
[58] Field of Search ........... 367/13, 25, 86, 188, 367/911, 48, 57; 73/104 E, 151; 33/303, 309, 313; 181/104, 102, 105; 250/268, 269; 175/45, 50

[56] References Cited

U.S. PATENT DOCUMENTS

| | | |
|---|---|---|
| 2,396,935 | 3/1946 | Walstrom ........................ 367/25 |
| 2,640,271 | 6/1953 | Boucher ......................... 33/309 |
| 2,959,241 | 11/1960 | Kokesh ........................ 367/35 |
| 3,363,719 | 1/1968 | Venghiattis .................... 181/104 |
| 3,542,150 | 11/1970 | Youmans et al. ............... 181/102 |
| 3,648,515 | 3/1972 | Youmans ........................ 73/152 |
| 3,731,273 | 5/1973 | Hunt ............................ 367/188 |
| 3,794,976 | 2/1974 | Mickler ......................... 367/25 |
| 3,978,939 | 9/1976 | Trouiller ....................... 181/104 |
| 4,227,405 | 10/1980 | West ............................ 33/313 |
| 4,448,057 | 5/1984 | Craig ............................ 73/1 DV |
| 4,524,324 | 6/1985 | Dickinson ...................... 33/304 |
| 4,661,933 | 4/1987 | Seeman et al. ................. 181/102 |
| 4,701,890 | 10/1987 | Ohmer et al. .................. 367/911 |
| 4,800,981 | 1/1989 | Uttecht et al. ................. 367/25 |
| 4,852,069 | 7/1988 | Clerke et al. .................. 367/35 |
| 4,870,626 | 9/1989 | Tvei ............................. 367/130 |
| 4,893,290 | 1/1990 | McNee et al. .................. 367/911 |
| 4,953,136 | 8/1990 | Kamata et al. ................. 367/25 |

FOREIGN PATENT DOCUMENTS 2185580  7/1987  United Kingdom .............. 33/313

Primary Examiner—Nelson Moskowitz

[57] ABSTRACT

A method and apparatus for detecting the orientation of downhole geophones are provided. A gamma ray source is secured to a casing enclosing a geophone such that the location of the gamma ray source with respect to the orientation of a geophone is known. The geophone is secured to tubing such that the orientation of the geophone with respect to the tubing is known. The tubing, with attached geophone, is secured downhole. A gamma ray logging tool is run the length of the tubing. The orientation of the downhole geophone is determined from the gamma ray log.

23 Claims, 3 Drawing Sheets

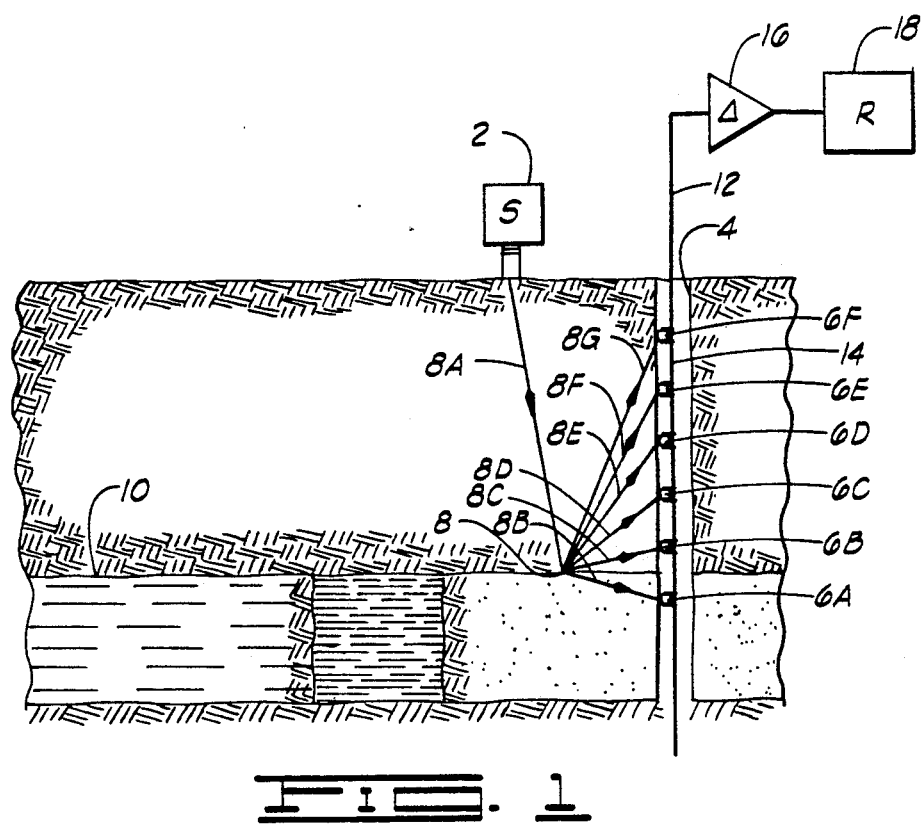
FIG. 1
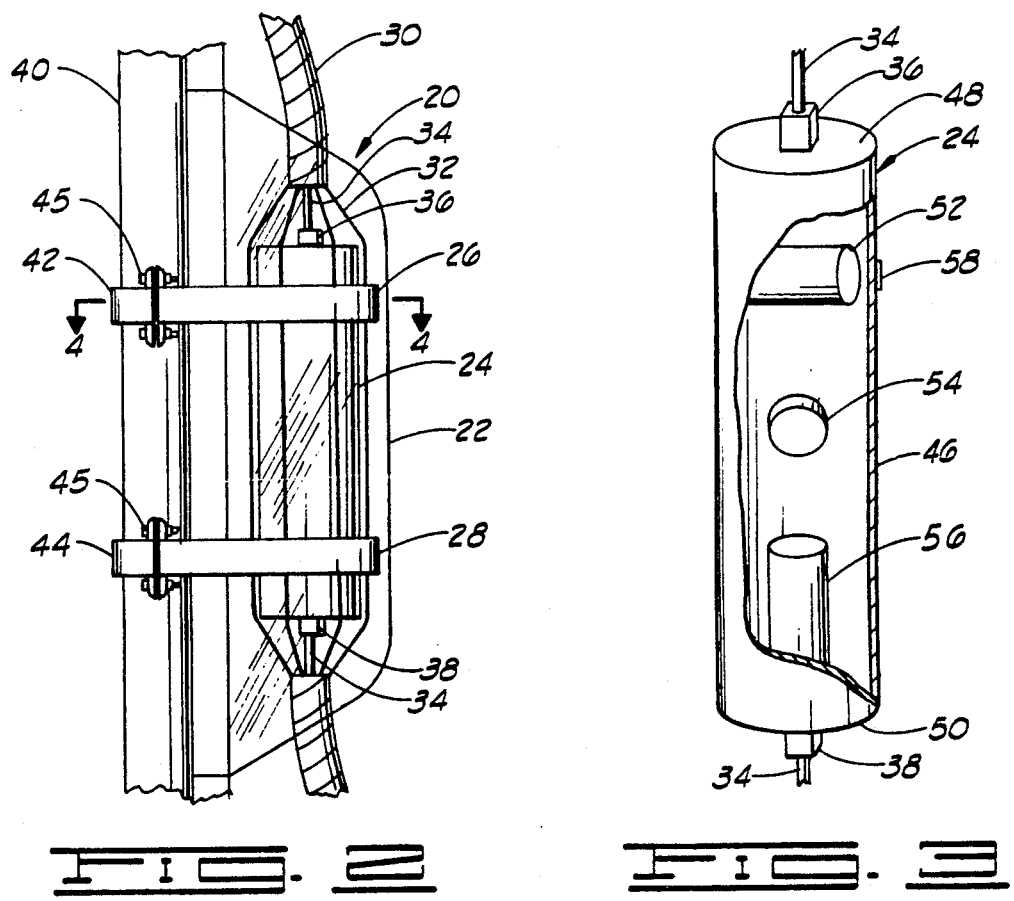
FIG. 2
FIG. 3

METHOD AND APPARATUS FOR DETECTING ORIENTATION OF DOWNHOLE GEOPHONES

BACKGROUND OF THE INVENTION

There are many different applications in which geophones are placed below the earth's surface, down a well or other borehole. In many of these applications it is necessary to know the orientation of the geophones as accurately as possible. This invention provides a method and apparatus for accurately determining the position and orientation of geophones once they have been positioned below ground.

Where the geophones are placed in shallow holes, the orientation and placement of the geophones may be determined from visual inspection, or it may be possible to place the geophones in the hole in such a way that the orientation and position is predetermined. However, in the more common case where the geophones are placed down a deep hole, there are considerable problems in accurately determining exactly where the geophones are located and how they are orientated after they have been lowered into the well or borehole. Even if the geophones are tightly attached to the tubing string, the tubing has a tendency to twist and deviate from the vertical as it is descending through the hole.

Commonly, the prior art has attempted to solve this problem by analyzing signals received by geophones from seismic sources with known locations relative to the hole in which the geophones are located. However, this analysis requires a detailed knowledge of the seismic characteristics of the earth between the source and the geophones in order to give an accurate answer, and this knowledge is often incomplete or uncertain. Further, the process of obtaining and analyzing the data is expensive and time-consuming.

Other prior art has used oriented devices which are an integral part of the geophone housing such as remote reading compasses. This method provides high accuracy but will not operate in proximity to iron. This excludes application in the vicinity of steel tubing or inside steel casing. Steel tubing is a very effective way of loading a cable with geophones into a borehole, and to introduce cement into the hole. Some applications for the downhole geophones call for use inside steel casing.

There are additional difficulties associated with the compass. Package design is considerably more costly due to length required to separate the compass from magnetic geophones. This length decreases the ability of the package to withstand pressures found deeper in boreholes. Remote reading devices also increase the requirements for electrical conductors in the cable and for surface operation and measurement control. Typically, several pairs of conductors would be required for each level.

BRIEF DESCRIPTION OF THE DRAWINGS

FIG. 1 is a vertical cross section extending from the surface into subterranean formations schematically illustrating a vertical seismic profiling method.

FIG. 2 is an elevational view of a geophone assembly.

FIG. 3 is an enlarged view of a geophone package with portions removed illustrating some internal structure.

DETAILED DESCRIPTION OF THE INVENTION

Figure 4:
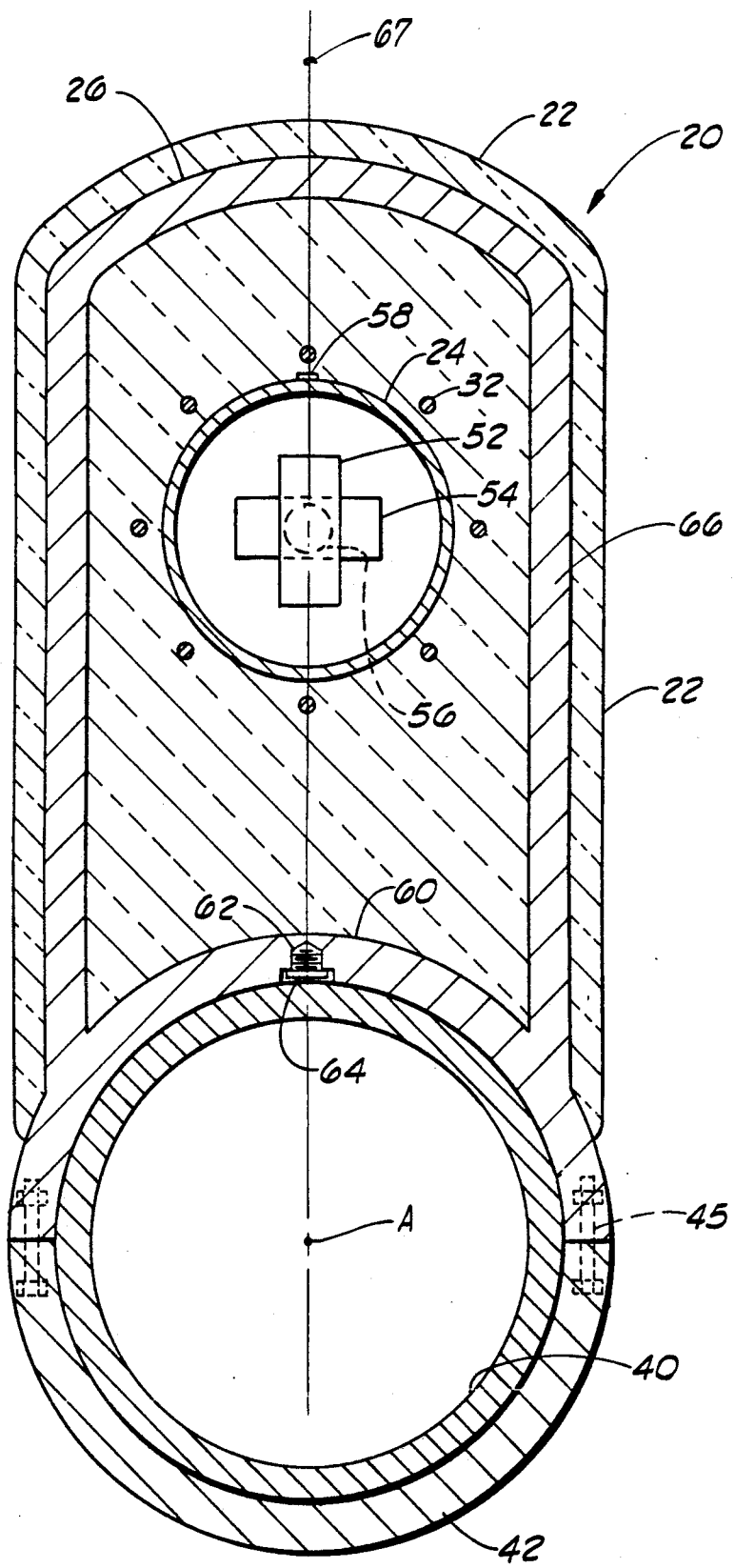
FIG. 4 is a cross sectional view of FIG. 2 through lines 4—4.

There are many applications that require geophones to be placed below ground for the acquisition of seismic data. For example, such geophones may be used for observation purposes, such as detecting earthquakes, monitoring nuclear testing or determining fracture activity and fluid flow in the process of recovering oil and other minerals. There are also a number of uses in which the geophones are recording seismic profiling, high angle reflection profiling, detection of fluid fronts in enhanced recovery methods, delineation of stratigraphic and structural features and measurement of seismic anisotropy for the purpose of evaluating fracture description, rock typing of fluid content.

As a specific example, the use of this invention in vertical seismic profiling will be described. However, the invention can just as well be used for any other propose which requires downhole geophones.

A typical vertical seismic profiling method is shown in FIG. 1. A source of seismic energy 2 is shown near the borehole 4. Sources may be of the vibrator type, and in any event must be capable of creating controlled seismic disturbances from each of a plurality of surface stations in turn. The seismic sensors, typified by sensors 6A–6F, which may include single or multiple sensor components (such as for example geophones) are positioned at various intervals in depth down one or more of the boreholes used to recover oil from the producing reservoir or to inject the fluid into the producing reservoir or the boreholes may be observation wells. The seismic sensors 6A–6F are positioned down borehole 4. Sensor 6A receives signal 8A from source 2 as 8B after refraction through the interface 10, the remaining sensors 6B–6F receive signal 8A reflected from point 8 on interface 10 as reflected signals 8C–8G respectively. In order to correctly interpret the received signals 8A–8G, the depth of each of the sensors 6A–6F from the surface must be known, and the orientation of each of the sensors relative to the position of source 2 must be determined.

In the preferred embodiment, the sensors 6A–6F are each composed of three geophones, one in a vertical position, and two in horizontal positions, preferably orthogonal to each other. The choice of suitable geophones depends upon the orientation of hole 4 with respect to the vertical and the downhole conditions, and is within the knowledge of those skilled in the art. The application of the present invention in not limited to any particular type of geophone.

In some applications only a single sensor may be required, but usually there will be several sensors separated vertically so as to be located approximately at predetermined depths down the hole. Preferably, these sensors 6A–6F are located on a common phone string 12. The output of the sensors 6A–6F is transmitted by cable 14 which forms part of geophone string 12, through amplifier 6 to recorder 18. The seismic instrumentation is conventional, well known, and is used in the conventional manner.

The choice of suitable cable for use as geophone string 12 depends upon the operation conditions down hole 4. At temperatures up to about 150° F., and pressures up to about 2000 psig, conventional surface cable can be used. It is preferred to use a cable with polyurethane jacket, which can be used at temperatures up to about 200° F. and pressures up to 5000 psig. It is also preferred to use a cable with an inner strength member, made of a material such as for example Kevlar.

Referring now to FIG. 2, the present invention comprises a geophone assemble designated generally by the reference numeral 20. The geophone assembly 20 includes a casing 22 sealingly enclosing a geophone package 24 and a pair of substantially identical brackets 26 and 28 vertically spaced along the length of the geophone package 24. The casing 22 also sealingly encloses a portion of a jacketed geophone cable 30 adjacent geophone package 24. The casing 22 is tapered at each end to facilitate insertion into and removal from the borehole. In the preferred embodiment, the casing 24 is constructed of transparent polyurethane.

In the preferred embodiment, a length of cable jacket is removed exposing a plurality of cable wires 32 and a strength member 34. As discussed in greater detail below, the cable wires 32 capture or "birdcage" the geophone package 24. The strength member 34 is spliced and secured to geophone package at fixtures 36 and 38 thereon.

The geophone assembly 20 is secured to a length of tubing 40 by a pair of collars 42 and 44. The collars 42 and 44 are secured by connectors 45 to brackets 26 and 28 respectively such that the collars 42 and 44 and brackets 26 and 28 frictionally engage the exterior of the tubing 40. It is understood that generally a plurality of geophone assemblies 20 are secured to tubing 40 when utilizing the present invention for seismic investigation, analysis and the like.

Referring now to FIG. 3, the geophone package 24 includes a housing 46 having upper and lower end surfaces 48 and 50. Fixtures 36 and 38 are secured, as by welding or molding to surfaces 48 and 50 respectively. Fixtures 36 and 38 are generally flat-sided for reasons described below.

Three geophones, 52, 54 and 56, are securely mounted in housing 46. Geophones 52 and 54 are each horizontally positioned and orthogonal to the other. Geophone 56 is vertically positioned.

A reference indicator 58 is secured to the exterior surface of the housing 46. In the present embodiment, the reference indicator 58 aligns with the horizontal axis of geophone 52. In this way, the orientation of the geophones, 52, 56 and 58 can be determined by external inspection of the housing 46. It will be understood that the reference indicator 58 may be positioned to align with any one of the geophones or at other locations along the housing 46 provided the location of the reference indicator 58 correlates to the orientation of at least one of the geophones in the geophone package 24.

Turning now to FIG. 4, semi-circular member 60 of bracket 26 conformaly engages a portion of tubing 40. Collar 42 is also semi-circular shaped for conformal engagement with tubing 40. A portion of the member 60 adjacent to tubing 40 is provided with a threaded aperture 62 sized to receive a threaded bolt 64. Aperture 62 opens towards the tubing 40 and is centered on the member 60 an equal distance between the parallel tines of a U-shaped member 66. Bolt 64 is provided with a radiating source (not shown), such as a gamma radiating source for a purpose described below.

The U-shaped member 66, integral with member 60, encircles a portion of the birdcaged geophone package 24. In the present embodiment, the casing 22 encloses the member 66 and portions of the member 60.

Line 67 illustrates an alignment between the reference marker 58, the center of aperture 62, and the center of tubing 40, point A.

Figure 5:
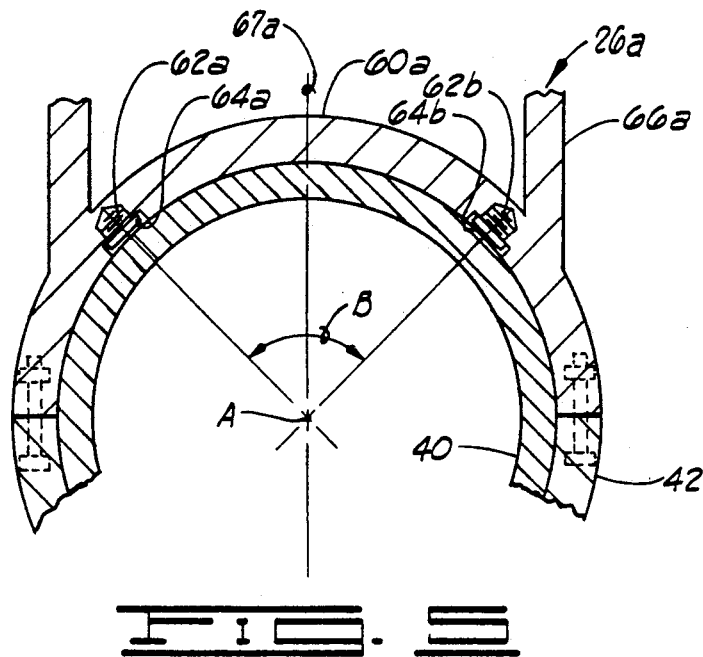
FIG. 5 is a fragmented view of FIG. 4 illustrating an alternative embodiment of the present invention.

FIG. 5 illustrates an alternate bracket embodiment for use in the present invention. Bracket 26a is constructed substantially similar to bracket 26 except that semi-circular member 60a is provided with two threaded apertures 62a and 62b. Each aperture is opens towards the tubing 40 and is sized to receive bolts 64a and 64b respectively. Each aperture, 62a and 62b, is centered on the member 60a and spaced an equal distance either side of center of member 60a. Bolts 64a and 64b are provided with a radiating source (not shown), such as a gamma radiating source for a purpose described below.

Line 67a illustrates an alignment between the reference marker 58 and point A. Line 67a also bisects angle B, formed by the intersection of the center of aperture 62a and point A and the intersection of the center of aperture 62b and point A.

Figure 6:
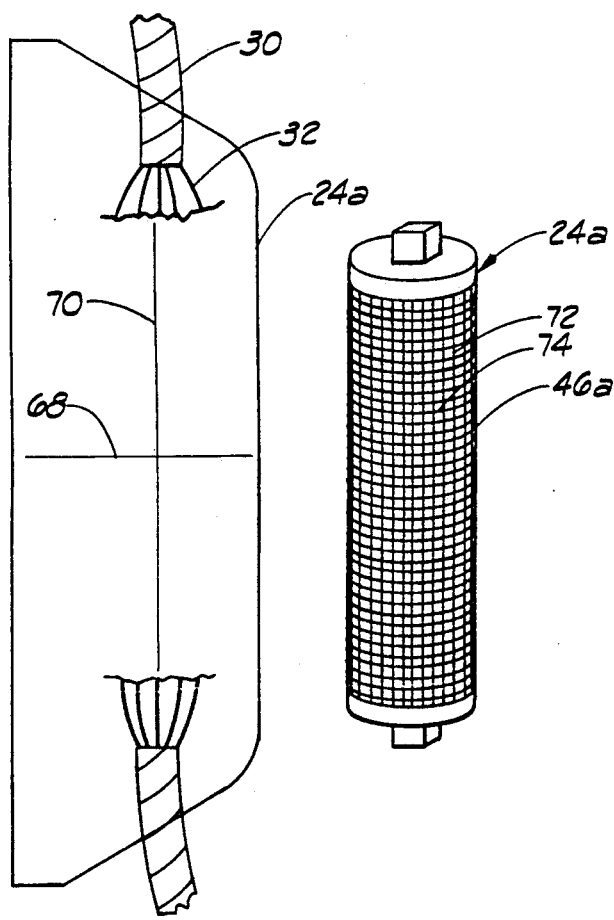
FIG. 6 is the view of FIG. 2 with the geophone package removed to more clearly illustrate another embodiment of the present invention.

FIG. 6 illustrates alternate casing and geophone package embodiments for use in the present invention. The casing 22a and the geophone package 24a are substantially similar to the casing 22 and the geophone package 24 except that both the casing 22a and the housing 46a of geophone package 24a are provided with at least one set of visible horizontal and vertical lines.

The casing 22a is provided with one vertical line 68 and one horizontal line 70 intersecting the vertical line 68. The housing 46a is provided with a plurality of vertical lines 72 and intersecting horizontal lines 74. It will be understood that after assembling the geophone assembly, the orientation of the geophones with respect to the axis of the casing can be determined by measuring the orientation of lines 68 and 70 relative to the lines 72 and 74.

In accordance with the present invention, the method of making the geophone assemble 20 is carried out by selecting a suitable length of cable 30. The length of cable 30 and spacing intervals of the geophone assembly 20 is dependent upon the type of application, the geological environment and other factors, and is made by those with suitable skills, such as geophysicists.

The geophone package 24 is then secured to the cable 30 by removing a portion of the cable jacket, approximately 2" longer than the geophone package 24, from the cable 30 such that cable wires 32 and strength member 34 are exposed. The cable 30 is then twisted in the opposite direction to the directional spiral of the cable wires 32 until the cable wires 32 extend outwardly a sufficient distance to accommodate the geophone package 24 which is centered therein. In this way, when tension is applied to the cable 30, the cable wires 32 capture the geophone package 24.

The strength member 34 is spliced and secured to fixtures 36 and 38. Electrical connections between the cable 30 and the geophone package 24 are made in the conventional manner. The birdcaged geophone package 24 is sleeved with brackets 26 and 28.

The bird caged geophone package 24 with brackets 26 and 28 are placed inside a tool which has been designed to produce a casing with the characteristics of the casing 22. Prior to introducing the curable fluid casing material into the tool, the geophone package 24 and brackets 26 and 28 are rigidly secured within the tool such that reference marker 58 aligns with the center of threaded aperture 62 as described above and illustrated in FIG. 4. In the event the bracket 26a is used (see FIG. 5) the reference marker (not shown) is aligned with the center of member 60a, illustrated by line 67a, such that line 67a bisects angle B. To facilitate securing and aligning the geophone package 24 in the tool, the surfaces of fixtures 36 and 38 are planer.

The tool is then filled with the curable fluid casing material, in the preferred embodiment polyurethane, under suitable conditions to ensure that there are no voids in the plastic when the casing material sets. When the casing material suitably cures, the tool is removed. The remaining geophone assemblies 20 are made in a similar manner.

For insertion into the well or borehole, the bolt 64 (or when the bracket 26a is used, bolts 64a and 64b), with the radiating source, is secured in the aperture 62 (or 62a and 62b as the case may be). The bottom geophone assembly 20 is secured to the tubing 40 as described above so that the vertical axes of the geophone assembly 20 and the tubing 40 are parallel. This procedure is repeated for each of the geophone assemblies, at the appropriate point as the tubing 40 is lowered into the well or borehole.

When the tubing is in place, the geophone assemblies 20 must be acoustically coupled to the wall of the hole. Preferably this is done by cementing the tubing 40 and attached geophone assemblies 20 in place, taking care that there are no large voids in the region of the geophone assemblies 20 which could reduce the acoustic coupling. It is important to ensure that the inside of tubing 40 is kept free of cement so that free passage for the radiating source detector, such as a base omnidirectional gamma ray logging tool (not shown), is preserved.

In accordance with the present invention, the method of detecting the location and orientation of downhole geophones is carried out by inserting the gamma ray tool into the tubing passage. The gamma ray tool is run over the length of the tubing 40 in order to locate the depth of each geophone assembly 20.

When a geophone assembly 20 is located by the gamma ray tool a gyroscope within the tool is rotated through 360°. The highest detected gamma ray activity will be in the direction of the gamma ray source secured to the bolt 64. When the bracket 26a is used, two activity spikes will be observed, one each for the gamma ray source secured to bolts 64a and 64b. As the orientation of the geophones 52, 54 and 56 are know relative to the geophone package 24 and as the location of the bolt 64 (or bolts 64a and 64b) relative to the geophone package 24 is known, the orientation of the geophones can be derived from the gamma ray log.

Accurate depth and offset location data are also measured. The process is repeated for each of the geophone assemblies 20 prior to recording from the geophones in the particular application for which they are to be used.

Additional advantages and modifications will be readily apparent to those skilled in the art. The invention in its broader aspects is therefore not limited to the specific details or the illustrative examples shown and described. Accordingly, changes may be made in the construction, operation, and arrangement of the various parts, elements, steps and procedures described therein without departing from the spirit and scope of the invention as defined in the following claims.

What is claimed is:

1. A downhole geophone assembly comprising:
    at least one geophone;
    a casing enclosing at least one geophone;
    means for securing a high frequency electro-magnetic radiation radiating source to the geophone assembly such that the location of the radiating source with respect to the orientation of the geophone is known;
    tubing having an internal surface and an exterior surface; and
    means for securing the geophone to the exterior surface of the tubing.

2. The apparatus of claim 1 wherein the means for securing a radiating source comprises a bolt, wherein the radiating source is secured to the bolt, and wherein the bolt is secured to the means for securing the geophone to tubing.

3. The apparatus of claim 2 wherein the means for securing the geophone to tubing comprises a bracket and a mating collar, wherein a portion of the bracket is secured to the casing.

4. The apparatus of claim 1 wherein the radiating source is further defined as a gamma radiating source.

5. The apparatus of claim 1 further comprising a geophone cable and means for capturing each geophone in a portion of the cable, wherein the casing encloses said portion of the cable.

6. A downhole geophone assembly, comprising:
    at lease one geophone package, wherein each geophone package includes an array of one or more geophones, and wherein the orientation of at least one of the geophones with respect to the geophone package is known;
    a casing securely enclosing at least one geophone package;
    means for securing at least one high frequency electro-magnetic radiation radiating source to the geophone assembly such that the location of the radiating source with respect to the orientation of the geophone package is known;
    tubing having an internal surface and an exterior surface; and
    means for securing the geophone package to the exterior surface of the tubing.

7. The apparatus of claim 6 wherein the means for securing at least one radiating source comprises a bolt, wherein the radiating source is secured to the bolt, and wherein the bolt is secured to the means for securing the geophone package to tubing.

8. The apparatus of claim 6 wherein the means for securing the geophone package to tubing comprises a bracket and a mating collar, wherein a portion of the bracket is secured to the casing.

9. The apparatus of claim 6 wherein the radiating source is further defined as a gamma radiating source.

10. The apparatus of claim 6 further comprising a geophone cable and means for capturing each geophone package in a portion of the cable wherein the casing encloses said portion of the cable.

11. The apparatus of claim 5 further comprising at least one observable vertical orientation line and at least one observable horizontal orientated line on both the geophone package and casing.

12. A method of detecting the orientation of downhole geophones in a geophone assembly comprising:

determining the orientation of at least one geophone in the geophone assembly;

securing a detectable radiating source to the geophone assembly such that the location of the radiating source with respect to the geophone in the preceding step is known;

securing the geophone assembly to tubing;

lowering the tubing into position downhole;

determining the orientation of the geophones by detecting the radiating source using a radiating source detector.

13. The method of claim 12 further including the step of enclosing one or more geophones in a casing.

14. The method of claim 13 wherein the step of enclosing one or more geophones in a casing comprises capturing at least one of the geophones in a portion of a cable wherein the said portion of the cable is enclosed in the casing.

15. The method of claim 12 wherein the detectable radiating source is a gamma radiating source.

16. The method of claim 12 wherein the radiating source detector is a gamma ray detector.

17. The method of claim 13 wherein the detectable radiating source is secured to the casing.

18. The method of claim 12 further comprising the step of securing the tubing downhole.

19. The apparatus of claim 1 further comprising a means for detecting the location of the radiating source downhole.

20. The apparatus of claim further comprising a means for detecting the location of the radiating source downhole.

21. A method of detecting the downhole location of downhole geophones in a geophone assembly comprising:

securing a detectable radiating source to the geophone assembly;

securing the geophone assembly to tubing;

lowering the tubing downhole; and determining the depth of the geophone by detecting the radiating source using a radiating source detector.

22. The method of claim 21 wherein the detectable radiating source is a gamma radiating source.

23. The method of claim 21 wherein the radiating source detector is a gamma ray detector.

* * * * *